United States Patent [19]

Cozza et al.

[11] Patent Number: 4,533,360

[45] Date of Patent: Aug. 6, 1985

[54] METHOD OF OBTAINING MAGNESIUM SULPHATE FROM MIXTURES OF SALTS

[75] Inventors: Giorgio Cozza; Luigi Piccolo, both of Milan, Italy

[73] Assignee: Ing. Luigi Conti Vecchi S.p.A., Assemini, Italy

[21] Appl. No.: 554,492

[22] Filed: Nov. 22, 1983

[30] Foreign Application Priority Data

Nov. 25, 1982 [IT] Italy .............................. 24431 A/82

[51] Int. Cl.$^3$ .............................................. B01D 9/02
[52] U.S. Cl. ........................................ 23/298; 23/304
[58] Field of Search .................... 23/298, 295 S, 304; 423/DIG. 15, 206 T, 155, 554

[56] References Cited

U.S. PATENT DOCUMENTS

| | | | |
|---|---|---|---|
| 1,156,388 | 10/1915 | Bradburn | 23/298 |
| 1,476,873 | 12/1923 | Burnham | 23/298 |
| 1,594,707 | 8/1926 | Binder | 23/298 |
| 1,815,735 | 7/1931 | Heath | 23/304 |
| 2,733,132 | 1/1956 | Burke | 23/304 |
| 3,297,413 | 1/1967 | Bennett | 23/304 |
| 3,339,618 | 9/1967 | Bowden et al. | 23/304 |
| 4,341,752 | 7/1982 | Groenhof | 23/304 |

Primary Examiner—Hiram H. Bernstein
Assistant Examiner—John Donofrio
Attorney, Agent, or Firm—Sughrue, Mion, Zinn, Macpeak & Seas

[57] ABSTRACT

Method of extracting magnesium sulphate from mixtures constituted essentially of magnesium sulphate heptahydrate and sodium chloride by means of heat treatment, grinding and dry grading.

7 Claims, No Drawings

METHOD OF OBTAINING MAGNESIUM SULPHATE FROM MIXTURES OF SALTS

The present invention relates to the recovery of magnesium sulphate, with a purity of 85% to 96% by weight expressed as magnesium sulphate heptahydrate, from mixtures of magnesium sulphate heptahydrate and sodium chloride. Such mixtures are formed, for example, by crystallisation following the seasonal cooling of mother liquors from sea water basins from which the sodium chloride, which crystallized as a result of an increase in concentration caused by evaporation, has already been separated.

The invention is not, however, intended to be limited to such salts and also extends to mixtures from any other provenience.

In order to recover the magnesium sulphate from such mixtures, it is not convenient to use the method of dissolution and fractional crystallisation which is well known in theory and in practice in classical chemistry.

Such methods are in fact too onerous and very complicated. The object of the present invention is, therefore, to provide a method of recovering magnesium sulphate from mixture of magnesium sulphate heptahydrate and sodium chloride which is based on heat and mechanical treatments which are very much simpler and more economical.

Magnesium sulphate with a high purity is recovered from mixtures treated according to the method of the present invention by means of grading by sieving or fluidization; clearly any other system of grading, for example with the aid of cyclones, fans etc., can be used to carry out the present invention. The salt obtained may be used as an additive for animal food or fertilizers or, after purification, in the pharmaceutical industry.

More particularly, the present invention consists of drying the mixture extracted from the salt pan, grinding it and subsequently separating the fine fraction which is constituted by magnesium sulphate with a high purity. The drying is carried out at temperatures of from 40° C. to 150° C., preferably from 45° C. to 120° C., until the free water content of the dried mixture is less than 2% and preferably less than 1.5% by weight.

The recovery process is effective also in case the free water content of the dried mixture is reduced to zero and the number of moles of crystallization water of magnesium sulphate is reduced to one.

The grinding is carried out until 15% to 40% by weight, preferably 18% to 35% by weight, of the dried mixture has a grain size of less than 0.044 mm. The mixture on which the experiments described in the example of the present invention was carried out was made up of magnesium sulphate heptahydrate and sodium chloride with a free water content of about 5%. One is not dealing with mixed salts but with a heterogeneous mixture of the two salts in two distinct phases: this is shown by X-ray diffractometry and is also seen under an optical microscope and even by macroscopic observation.

Under the microscope, the presence of translucent needleshaped crystals of magnesium sulphate heptahydrate and opaque, cubic crystals of sodium chloride is noted: together with the individual crystals, however, there is also a considerable quantity of agglomerates and aggregates.

Under macroscopic examination, the mixture is seen to consist of the two aforesaid types of crystals, large agglomerates and a certain quantity of large magnesium sulphate heptahydrate crystals.

Agglomerates and large crystals may even reach a diameter of 20 mm. The salt mixture is in the form of a wet crystalline product and its water content is such as to keep it lumped together and prevent its free flow.

The salt mixture has a rather heterogeneous composition: it has a magnesium sulphate heptahydrate content of, on average, about 65% and a water content of about 5%; the magnesium sulphate heptahydrate content may fall to 59% as shown in the following Table.

|  | Sample 1 | Sample 2 | Sample 3 |
| --- | --- | --- | --- |
| $MgSO_4.7H_2O$ % | 59 | 66 | 66 |
| NaCl % | 35 | 29 | 28 |
| KCl % | 0.6 | 0.5 | 0.6 |
| $H_2O$ (free) | 5.4 | 4.5 | 5.4 |

Several salt-mixture samples were wet sieved in order to determine their actual granulometry. It should be noted that it is impossible to determine the granulometry on the mixture as such in that it is excessively wet; on the other hand, granulometry effected on the heat-dried product does not give reliable results since the salt agglomerates.

The medium used for the wet sieving was a saturated solution of the salt mixture itself with a density of 1.267 at 16° C.; the results obtained are given in the following Table:

| Grain size (mm) | Sample 1 % by weight | Sample 2 % by weight | Sample 3 % by weight | Sample 4 % by weight |
| --- | --- | --- | --- | --- |
| <4.76 | 66.9 | 63.6 | 55.6 | 59,4 |
| 4.76–10 | 21.2 | 20.7 | 21.7 | 23.8 |
| 10–20 | 5.7 | 8.0 | 9.1 | 8.8 |
| >20 | 6.2 | 7.7 | 13.6 | 8.0 |

A sample of salt mixture was dried at 52° C. for 16 hours and then graded by sieving with the results given in the following Table:

| Grain size (mm) | % by weight | $MgSO_4.7H_2O$ % |
| --- | --- | --- |
| <0.25 | 10.8 | 75.0 |
| 0.25–0.5 | 17.5 | 73.3 |
| 0.5–1 | 8.9 | 72.7 |
| 1–2 | 11.6 | 58.5 |
| 2–4.76 | 16.9 | 45.5 |
| 4.76–10 | 22.8 | 50.0 |
| 10–20 | 6.0 | 78.0 |
| >20 | 5.51 | 82.7 |

It may be seen from this Table that the fractions with the higher magnesium sulphate heptahydrate contents are those with the largest grain sizes.

Now, we have found surprisingly that on grinding of this dried mixture, the finest fractions become enriched in magnesium sulphate.

Thus the object of the present invention is to dry the salt mixture to a residual free water content such as to avoid lumping and allow good grinding; to grind the dried mixture to a degree of fineness such as to maximise the recovery of magnesium sulphate with a high purity; to separate the fine fractions of the ground salt mixture from the other fractions. In order to illustrate the present invention, without limiting the invention itself, the following examples are given.

EXAMPLE 1

1000 grams of a salt mixture exactly as taken from "Conti Vecchi" salt pans at Cagliari having the following chemical composition:

| | |
|---|---|
| $MgSO_4 \cdot 7H_2O$ | 66% by weight |
| NaCl | 29% by weight |
| KCl | 0.5% by weight |
| $H_2O$ | 4.5% by weight | were dried in a layer 1 cm deep at 52° C. for 16 hours in a flow of nitrogen of 3 $Nm^3/h$ to give a product with practically no free water.

420 grams of the dried salt were ground in a porcelain jar having a volume of 1150 ml, with the aid of eight porcelain balls, each 35 mm in diameter and having an overall weight of 422 grams; the jar was rotated at a rate of 17 revolutions per minute.

Samples were taken from the salt mixture after 10 hours of grinding, after 18 hours of grinding and after 40 hours of grinding; the samples were sieved and the various fractions from the sieving were analysed. The results are given in the following table:

| Grinding time (hours) | Grain Size (mm) | % by weight | % $MgSO_4.7H_2O$ |
|---|---|---|---|
| 10 | <0.044 | 18 | 90.0 |
| | 0.044–0.149 | 30 | 62.7 |
| | 0.149–0.5 | 39 | 39.5 |
| | >0.5 | 13 | n.d. |
| 18 | 0.0044 | 35.3 | 90.0 |
| | 0.044–0.149 | 27.9 | 59.7 |
| | >0.149 | 36.8 | n.d. |
| 40 | <0.044 | 36.5 | 87 |
| | 0.044–0.149 | 30.7 | n.d. |
| | >0,149 | 32,8 | n.d. |

EXAMPLE 2

The experiment of Example 1 was repeated with a single difference, that is, in the manner of drying; the drying was carried out at 45° C. instead of 52° C., a product being obtained with a free water content of 1.1%.

The results are given in the following Table:

| Grinding time (hours) | Fraction below 0.044 mm. % by weight | % $MgSO_4.7H_2O$ |
|---|---|---|
| 10 | 20.5 | 92 |
| 18 | 37 | 91 |
| 40 | 41.5 | 85.5 |

From this Example it is seen that the drying of the salt mixture at a lower temperature improves both the grinding efficiency and the selectivity.

EXAMPLE 3

The experiment of Example 1 was repeated with the difference that the drying was carried out at a temperature of 35° C., a product being obtained with a free water content of 2.4%. The product thus obtained was ground for 10 hours.

It was impossible to separate the fine fraction by sieving because the water content in the material gave rise to compacting which prevented its passage through the mesh of the sieve.

EXAMPLE 4

The experiment of Example 1 was repeated with a difference in the manner of drying; the drying was in fact carried out at 120° C. and a product was obtained in which the magnesium sulphate was present in the form of the monohydrate, no free water being present. The results are given in the following Table:

| Grinding time (hours) | Grain size (mm) | % by weight | % $MgSO_4.7H_2O$ |
|---|---|---|---|
| 10 | <0.044 | 16.5 | 85 |
| | 0.044–0.149 | 28 | 76 |
| | >0.149 | 55.5 | n.d. |
| 18 | <0,044 | 22 | 84 |
| | 0.044–0.149 | 36 | 76 |
| | >0.149 | 42 | n.d. |

*For comparison with Examples 1 and 2, the magnesium sulphate was still evaluated as $MgSO_4.7H_2O$ even though the degree of hydration was different.

When these results are compared with those of Examples 1 and 2, it is noted that, both with regard to the efficiency of grinding and with regard to the selectivity, it is preferable to carry out the drying at about 50° C. rather than at 120° C.

EXAMPLE 5

1000 grams of salt mixture were dried at 45° C. as in Example 2; they were subsequently ground and sieved to separate the fraction below 0.5 mm and a product was obtained with the granulometric and analytical characteristics given in the following Table:

| Grain size (mm) | % by weight | % $MgSO_4.7H_2O$ |
|---|---|---|
| <0.044 | 3.3 | 81.8 |
| 0.044–0.149 | 36.5 | 70 |
| 0.149–0.25 | 26 | 52.4 |
| 0.25–0.5 | 34.2 | 64.3 |

This product was treated in a fluidized bed with the following characteristics:

| | |
|---|---|
| Reactor diameter: | 55 mm |
| Salt mixture load: | 660 g |
| Air flow: | 750 Nl/h |
| Treatment temperature in the fluidized bed: | 120° C. |
| Duration of treatment: | 4 hours |
| Discharge from the bed at the end of the test: | Three fractions are discharged from the bottom of the reactor: each fraction was sieved with a 0.044 mm sieve and subjected to chemical analysis: a fourth fraction was collected as the entrained fraction. |

The characteristics of the product obtained from this treatment are given in the following Table:

| Part of the bed | Grain size (mm.) | % by weight of the total | %* $MgSO_4.7H_2O$ |
|---|---|---|---|
| Bottom | <0.044 | <5 | 95.5 |
| | 0.044–0.149 | 9.2 | 59 |

-continued

| Part of the bed | Grain size (mm.) | % by weight of the total | %* MgSO$_4$.7H$_2$O |
|---|---|---|---|
| Middle | <0.044 | 5.5 | 96 |
|  | 0.044–0.149 | 7.5 | 61.5 |
| Top | <0.044 | 8.0 | 96 |
|  | 0.044–0.149 | 11.0 | 66 |
| Entrained | <0.044 | 15 | 88 |

*The Mg content is always given as the heptahydrate in order to give a comparison with the results of the preceding examples. From these results it may be seen that the treatment in the fluidized bed, combined with the heat treatment (120° C.), has a grinding and grading effect on the salt mixture with enrichment of the fine fractions in MgSO$_4$.7H$_2$O.

We claim:

1. Method of recovering magnesium sulphate with a purity of from 85% to 96% by weight, expressed as magnesium sulphate heptahydrate, from a starting mixture of magnesium sulphate heptahydrate and sodium chloride, comprising drying the starting mixture of magnesium sulphate heptahydrate and sodium chloride at a temperature of from 40° C. to 150° C. until the free water content of the dried mixture is less than 2% by weight; grinding said dried mixture until from 15% to 40% by weight thereof has a grain size of less than 0.044 mm.; and then separating the fine fraction.

2. Method according to claim 1, wherein said starting mixture is dried until the free water content of the dried mixture is less than 1.5% by weight.

3. Method according to claim 2, wherein said starting mixture is dried until the free water content of the dried mixture is zero and the number of moles of crystallization water of magnesium sulphate is reduced to 1.

4. Method according to claim 1, wherein the magnesium sulphate heptahydrate and sodium chloride starting mixture has a magnesium sulphate heptahydrate content of from 56% to 66% by weight.

5. Method according to claim 4, wherein said starting mixture has a free water content of from 4% to 6% by weight.

6. Method according to claim 5, wherein said starting mixture is obtained by crystallization of mother liquors from sea water basins from which the sodium chloride has already been separated.

7. Method according to claim 5, wherein said starting mixture is dried at a temperature of from 45° C. to 120° C.

* * * * *